W. R. MARSH.
WINDSHIELD SHADE.
APPLICATION FILED JULY 1, 1920.
1,383,323.
Patented July 5, 1921.
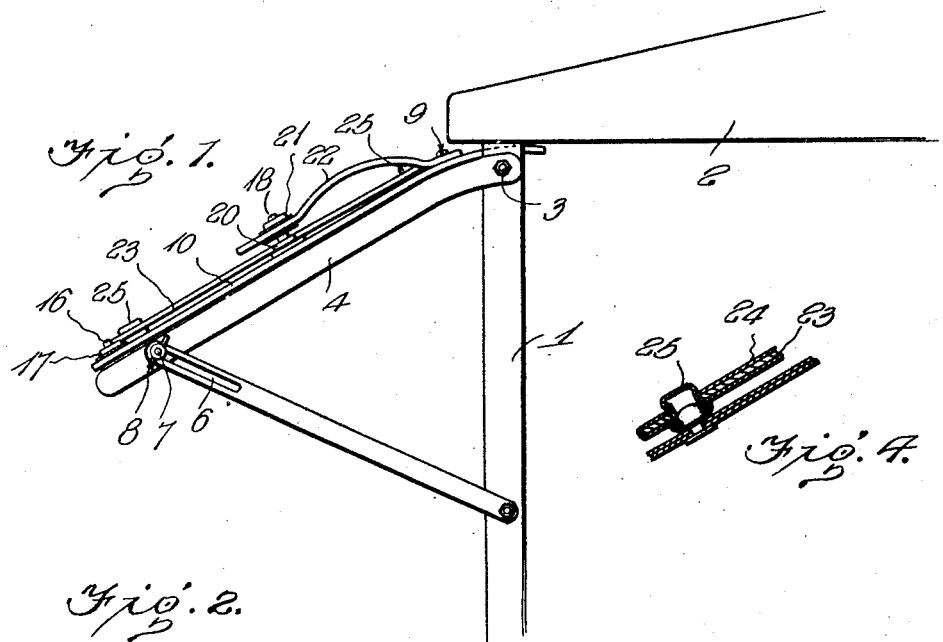
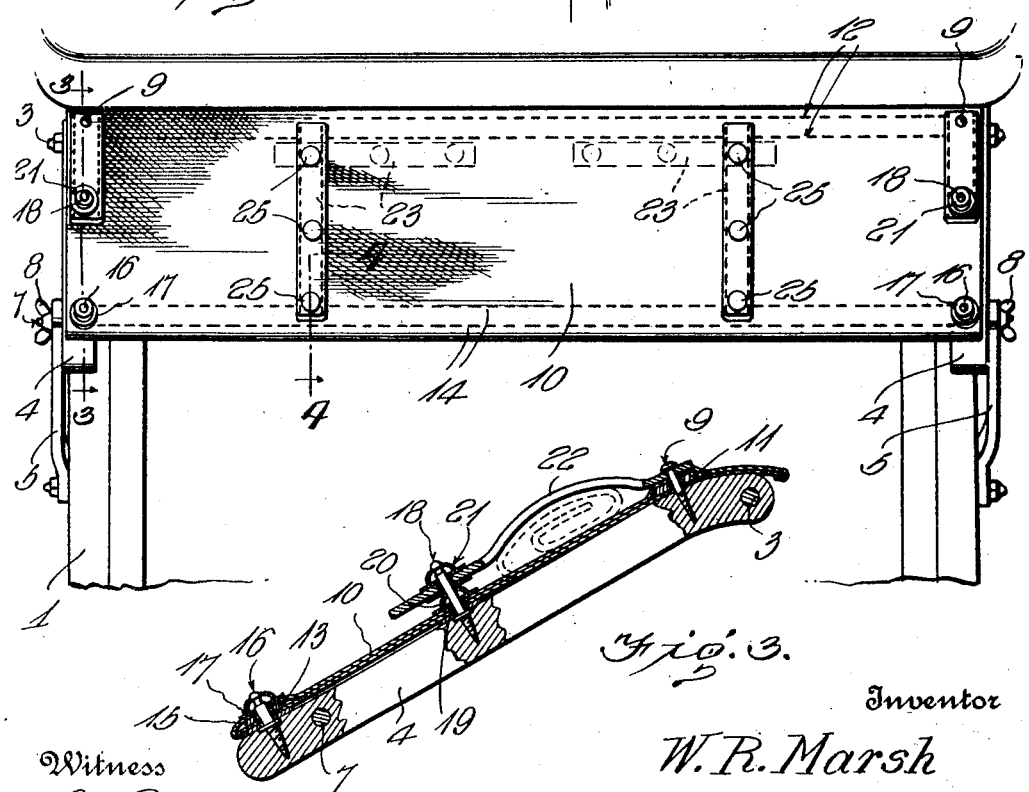
Witness
J. R. Pierce
Inventor
W. R. Marsh
By H. B. Willson & Co.
Attorneys

UNITED STATES PATENT OFFICE.

WILLIAM RALPH MARSH, OF MUSKOGEE, OKLAHOMA.

WINDSHIELD-SHADE.

1,383,323.  Specification of Letters Patent.  Patented July 5, 1921.

Application filed July 1, 1920. Serial No. 393,286.

*To all whom it may concern:*

Be it known that I, WILLIAM R. MARSH, a citizen of the United States, residing at Muskogee, in the county of Muskogee and State of Oklahoma, have invented certain new and useful Improvements in Windshield-Shades; and I do declare the following to be a full, clear, and exact description of the invention, such as will enable others skilled in the art to which it appertains to make and use the same.

My invention relates to improvements in shades to prevent strong light such as sunlight from glaring in the eyes of automobile drivers. The device declines forwardly from the upper end of the windshield in much the same manner as similar devices heretofore used, but the principal objects of my invention are to make novel provision for both holding the shade lowered for use and rolled when its use is not necessary, and to provide strips for stiffening the shade when lowered, said strips being movable to positions longitudinally of the shade when the latter is to be rolled.

With the foregoing in view, the invention resides in the novel construction and arrangement of parts hereinafter described and claimed, the descriptive matter being supplemented by the accompanying drawings.

Figure 1 is an edge view of the invention applied to a windshield.

Fig. 2 is a front elevation of the parts shown in Fig. 1.

Figs. 3 and 4 are detail vertical sections as indicated by lines 3—3 and 4—4 of Fig. 2.

In the drawings above briefly described, I have illustrated a windshield frame 1 to whose upper end the automobile top 2 is attached in the usual way. Secured by any preferred means 3 to the upper end of the frame 1 and declining downwardly from said frame, are two bracket arms 4 which may be disposed at different inclinations and held by appropriate braces 5 or other suitable means. The braces 5 are preferably provided with slots 6 for receiving bolts 7 which are equipped with thumb nuts 8.

Secured to the upper ends of the bracket arms 4 by any preferred means such as screws 9, is a horizontally elongated shade 10, said shade being preferably formed of two thicknesses of material reinforced near their upper edges by a metal bar 11 having openings through which the screws 9 pass as seen in Fig. 3. The two plies of material are stitched together at 12 along the opposite edges of the bar 11 as seen in Fig. 2 and the shade is thereby held against creeping on said bar. The lower end of the shade 10 is reinforced by a metal bar 13 preferably identical with the bar 11 in order that separate parts need not be manufactured for the upper and lower edges of the curtain. The bar 13, like the bar 11, is interposed between the two plies of the shade 10 and said plies are stitched together along the edges of said bar as shown at 14 in Fig. 2. At its ends, bar 13 is formed with openings 15 adapted to receive posts 16 which rise from the front ends of the bracket arms 4. These posts pass also through openings in the shade and said shade carries suitable spring eyes 17 which are preferably of well known form, such as the articles now commonly known as "Lift the dot." Other posts 18 rise from the intermediate portions of the bracket arms 4 for reception in openings 19 in the shade and spring eyes 20 on said shade engage the posts, said posts, however, extending above the eyes 20 to co-act with similar eyes 21 on the front ends of straps 22. The upper ends of these straps are secured in any preferred manner to the shade, but the screws 9 are preferably utilized for this purpose.

When the shade is lowered, the posts 16 and the eyes 17 secure the lower end of said shade to the bracket arms 4, while the central posts 18 and the eyes 20 and 21, perform the two-fold function of securing the intermediate portion of the shade in place and anchoring the front ends of the straps 22. When the shade is to be rolled as seen in dotted lines in Fig. 3, said shade and the straps 22 are disengaged from the posts 16 and 18 and when said shade is rolled up to the required extent, it may be positioned beneath the aforesaid straps and held in this position by again engaging the eyes 21 with the posts 18.

Preferably used in connection with the features above described, are stiffening strips 23 which may be provided with a suitable covering 24 if desired. These strips extend transversely of the shade 10 when the latter is lowered for use as shown in full lines in Figs. 1 and 2 and may be swung to position them longitudinally of the shade as seen in dotted lines in Fig. 2, thereby permitting the shade to be rolled. When the strips are in use, their ends preferably overlie the bars 11 and 13 and said strips then serve to stiffen the shade and prevent sagging thereof. Any suitable means may be employed for pivoting the strips 23 to the shade 10 and for holding the same in operative position, but I prefer to employ common types of snap fasteners 25 very similar to the ordinary glove fastener.

The device has been used and has been found to be of great advantage. When lowered, glare from the sun is prevented from interfering with the driver's vision and whenever its use is not needed, it may be rolled as seen in Fig. 3. Since probably the best results may be obtained from the several details shown, they may well be followed, but within the scope of the invention as claimed, numerous minor changes may be made, not only in the curtain itself and its fastening means, but the brackets for supporting said curtain may vary as occasion may demand.

I claim:

1. In a windshield shade, supports adapted to decline from a windshield, a pliable shade secured at its upper end to said supports, means for detachably connecting the lower end of said shade with said supports, posts rising from said supports between their ends, said shade having eyes through which said posts project, straps secured to the upper end of the shade and adapted for holding the same in rolled position, and fasteners on the front ends of said straps for engagement with the upper ends of said posts when the shade is either rolled or unrolled.

2. In a windshield shade, a pair of supports adapted to decline from a windshield, a pliable shade secured at its upper end to said supports, posts rising from the front ends of said supports, spring eyes on the shade co-acting with said posts to detachably anchor the lower end of the shade, relatively long posts rising from said supports between their ends, eyes carried by the shade and receiving said relatively long posts, straps secured at their upper ends to the upper end of the curtain, and spring eyes on the front ends of said straps for passage over said relatively long posts when the shade is either in lowered or rolled position.

3. In a windshield shade, supports adapted to decline from a windshield, a pliable curtain secured at its upper end to said supports and detachably connected at other points with said supports, and a stiffening strip in contact with one side of said flexible curtain, extending transversely across said curtain and movable to a position longitudinally thereof to permit the curtain to be rolled to the upper end of said supports, and means for holding said curtain in rolled position.

4. A structure as specified in claim 3, said stiffening strip being pivoted to said shade, and means for detachably securing said stiffening strip in active position.

5. A structure as specified in claim 3, said stiffening strip being secured to the shade by snap fasteners, one of which forms a pivot upon which the strip may be swung to active and inactive positions.

In testimony whereof I have hereunto set my hand.

WILLIAM RALPH MARSH.